United States Patent
Dahlberg et al.

(10) Patent No.: US 10,891,712 B2
(45) Date of Patent: Jan. 12, 2021

(54) CORRECTING IMAGE OVERLAY

(71) Applicant: Axis AB, Lund (SE)

(72) Inventors: Simon Dahlberg, Lund (SE); Anders Persson, Lund (SE); Rémy Javelle, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/425,510

(22) Filed: May 29, 2019

(65) Prior Publication Data

US 2019/0370930 A1    Dec. 5, 2019

(30) Foreign Application Priority Data

Jun. 1, 2018 (EP) .................................... 18175512

(51) Int. Cl.
*G06T 3/00* (2006.01)
*G06T 7/10* (2017.01)
*H04N 5/235* (2006.01)

(52) U.S. Cl.
CPC .............. *G06T 3/0062* (2013.01); *G06T 7/10* (2017.01); *H04N 5/2353* (2013.01); *G06T 2207/20132* (2013.01)

(58) Field of Classification Search
CPC .................. G06T 3/0062; G06T 7/10; G06T 2207/20132; H04N 5/2353; H04N 5/262; H04N 5/265; H04N 7/18
See application file for complete search history.

(56) References Cited

U.S. PATENT DOCUMENTS

| | | | |
|---|---|---|---|
| 5,471,249 A | 11/1995 | Monta et al. | |
| 9,495,876 B2* | 11/2016 | Lu | ....................... H04N 5/23293 |
| 9,762,816 B2 | 9/2017 | Ogino | |
| 2016/0119551 A1* | 4/2016 | Brown | .................. G06T 3/0062 |
| | | | 345/646 |

(Continued)

FOREIGN PATENT DOCUMENTS

| | | |
|---|---|---|
| CN | 201690532 U | 12/2010 |
| EP | 3 086 562 A1 | 10/2016 |

(Continued)

OTHER PUBLICATIONS

Extended European Search Report dated Jul. 17, 2018 for the European Patent Application No. 18175512.5.

(Continued)

*Primary Examiner* — John W Lee
(74) *Attorney, Agent, or Firm* — Volpe Koenig

(57) ABSTRACT

Methods and apparatus, including computer program products, implementing and using techniques for displaying a video. A video stream including a plurality of image frames, wherein at least some image frames include an overlay, is received by a video management system. The video management system determines a position of the overlay within an image frame. The video management system applies an image adjustment function to the image frame to create an adjusted image frame. The image adjustment function uses the determined position of the overlay to adjust the image while keeping the appearance of the overlay essentially unchanged, and the video stream including the adjusted image frame is displayed.

11 Claims, 3 Drawing Sheets

(56) References Cited

U.S. PATENT DOCUMENTS

2016/0316219 A1* 10/2016 Yuan .................. H04N 21/84
2018/0150994 A1    5/2018 Foutzitzis et al.

FOREIGN PATENT DOCUMENTS

JP    04-347980 A    12/1992
JP    08-009281 A    1/1996

OTHER PUBLICATIONS

"An Immersive System for Browsing and Visualizing Surveillance Video", DeCamp et al.; Proceedings of the ACM Multimedia 2010 International Conference: ACM MM'10 & Co-Located Workshops; Oct. 25-29, Firenze, Italy, Association for Computing Machinery, New York, NY, Oct. 25, 2010; pp. 371-380; XP058390050.
Extended European Search Report issued Jul. 17, 2018 for the European Patent Application No. 18175512.5.

\* cited by examiner

CORRECTING IMAGE OVERLAY

FIELD OF INVENTION

The present teachings relate to video systems, and more specifically, to processing overlays inserted in a video stream delivered by a monitoring camera.

BACKGROUND

Monitoring cameras are used in many different applications, both indoors and outdoors, for monitoring a variety of environments. Many monitoring cameras have the possibility to insert an overlay into the video stream delivered by the camera. The overlay is often some kind of text-based information from the camera, such as a time stamp, date, and the like. Other types of overlay information may include data from an external sensor or device, such as temperature, wind speed, or humidity. Yet other types of overlay information may include text that has been stored in the camera by someone having access to the camera.

Monitoring cameras are often controlled and managed by some kind of video management system (VMS). Typically, the overlay is not sent separately to the VMS, but is instead included in the individual frames in the video stream that is sent by the monitoring camera to the VMS.

When a video stream representing a wide-angle view captured by a monitoring camera (e.g., a fisheye view) and that wide-angle view is subsequently dewarped by the VMS (i.e., corrected for optical distortions, such as barrel distortion and/or other image distortions), this causes the overlay to become warped. The degree of warping can vary anywhere from the overlay merely becoming somewhat unsightly to the overlay essentially disappearing from the dewarped video. In either case the overlay becomes difficult or even impossible to read for an operator viewing the video stream.

SUMMARY

An object of the present teachings is to wholly or partly eliminate the above problems. This object is achieved by a method, a system, a computer program product, and a non-transitory computer readable storage medium recited in the claims.

According to a first aspect, the present teachings relate to a method, in a computer system, for displaying a video. The method is characterized by: receiving, by a video management system, a video stream including a plurality of image frames, wherein at least some image frames include an overlay; determining, by the video management system, a position of the overlay within an image frame; applying, by the video management system, an image adjustment function to the image frame to create an adjusted image frame, wherein the image adjustment function uses the determined position of the overlay to adjust the image while keeping the appearance of the overlay essentially unchanged; and displaying the video stream including the adjusted image frame.

This provides a way of improving the visual appearance and readability for an overlay on a video stream that has been captured by monitoring camera using a wide-angle view captured by a monitoring camera, followed by subsequent dewarping by a VMS. It also ensures that the overlay does not disappear from the video in the dewarping process.

According to one embodiment, applying the image adjustment function includes one or more of: spatially rearranging pixels of the image frame, and changing values of pixels in the image frame. Spatially rearranging pixels of the image frames allows the pixels forming the overlay to be moved to a different area to the image and to be rearranged in such a manner that the overlay becomes clear and readable. Changing values of pixels makes it possible to change the color or contrast of individual pixels and thereby improve the readability of the overlay with respect to the rest of the image.

According to one embodiment, applying the image adjustment function includes: copying the overlay from the image frame, spatially rearranging pixels of the image frame, and inserting the copied overlay into the image frame with the spatially rearranged pixels. This provides a convenient way of retaining the original appearance of the overlay, as the overlay is copied before any rearrangement of the pixels in the image frames occurs, and the overlay subsequently is re-inserted into the image after the pixels in the image have been rearranged.

According to one embodiment, spatially rearranging pixels of the image frame includes spatially rearranging pixels of the image frame that do not form part of the overlay. In this embodiment, the overlay is left untouched, and only the rest of the image has its pixels spatially rearranged. This also allows the appearance of the original overlay to be preserved, and reduces the number of operations and memory requirements needed to copy/store the overlay while the image is being processed.

According to one embodiment, the copied overlay is inserted at essentially the same position of the image frame from which the overlay was copied. This makes it easy for a user to know where to look for the overlay, even if the size of the image happens to be very large in relation to the size of the overlay, or if the contrast between the image and the overlay were to be poor.

According to one embodiment, the image adjustment function is a dewarping function, an exposure correction function, or a cropping function. The ability to adapt the general principles of the present teachings to various types of image correction function makes it possible to use the present teachings in a variety of settings and with a variety of monitoring cameras.

According to one embodiment, the video stream and overlay are received in real time from a monitoring camera. This makes it possible to implement the present teachings in the context of live streaming video from a monitoring camera.

According to one embodiment, the video stream and overlay are received from a video server. This makes it possible to implement the present teachings in the context of video from a monitoring camera that has been stored on a server for later viewing, and do the processing at that point rather than prior to storing the video on the server.

According to one embodiment, position information for the overlay in the video stream is received by the video management system separately from the video stream. Receiving the position information separately from the video stream greatly simplifies the determination of the position of the overlay, and improves the image processing speed while reducing the computing power needed.

According to one embodiment, the position information includes normalized coordinates for the position of the overlay in the video stream. Normalized coordinates ensure that the overlay will end up in the same position in the image after image processing by the VMS, as before processing by the VMS.

According to one embodiment, a user input is received, which specifies a position of the overlay in the video stream with the spatially rearranged pixels. This gives a user the option of changing the position of the overlay in the processed image, in the event the user were to determines that a different position might be better, for example, if the overlay would cover essential features of the processed image.

According to a second aspect, the present teachings relate to a system for displaying a video. The system includes a processor and a memory. The memory has instructions that when executed by the processor causes the following operations to be performed by the processor: receiving, by a video management system, a video stream including a plurality of image frames, wherein at least some image frames include an overlay; determining, by the video management system, a position of the overlay within an image frame; applying, by the video management system, an image adjustment function to the image frame to create an adjusted image frame, wherein the image adjustment function uses the determined position of the overlay to adjust the image while keeping the appearance of the overlay essentially unchanged; and displaying the video stream including the adjusted image frame.

According to a third aspect, the present teachings relate to a computer program product for displaying a video. The computer program product contains instructions causing a device having a processing capability to perform operations comprising: receiving, by a video management system, a video stream including a plurality of image frames, wherein at least some image frames include an overlay; determining, by the video management system, a position of the overlay within an image frame; applying, by the video management system, an image adjustment function to the image frame to create an adjusted image frame, wherein the image adjustment function uses the determined position of the overlay to adjust the image while keeping the appearance of the overlay essentially unchanged; and displaying the video stream including the adjusted image frame.

According to a fourth aspect, the present teachings relate to a non-transitory computer readable storage medium comprising such a computer program. The computer program and the non-transitory computer readable storage medium involve advantages corresponding to those of the method and may be varied similarly.

The details of one or more embodiments of the present teachings are set forth in the accompanying drawings and the description below. Other features and advantages of the present teachings will be apparent from the description and drawings, and from the claims.

BRIEF DESCRIPTION OF THE DRAWINGS

A more detailed understanding can be had from the following description, given by way of example in conjunction with the accompanying drawings wherein.

Like reference symbols in the various drawings indicate like elements.

DETAILED DESCRIPTION

The various embodiments of the present teachings pertain to techniques for processing overlays inserted in a video stream delivered by a monitoring camera. The VMS receives positional information for the overlay in the video stream (which is typically a wide-angle or "fisheye" video stream). The received positional information is used to exclude the overlay from any dewarping operation that is performed by the VMS on the individual images in the video stream. The way in which the positional information is used to exclude the overlay can be done in a number of different ways. Finally, after dewarping by the VMS, the overlay is applied to the images in the video stream, such that a readable and visually pleasing appearance of the overlay is achieved.

Figure 1:
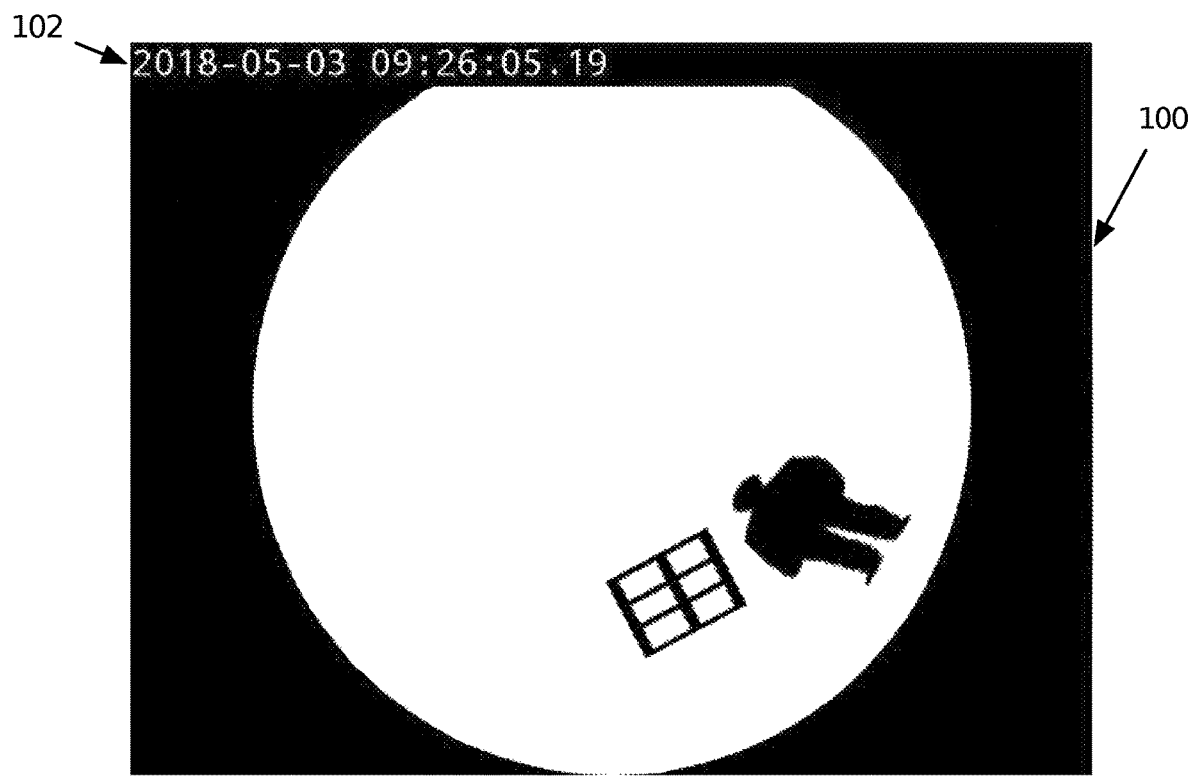
FIG. 1 shows a schematic image of a scene captured by a surveillance camera using a wide-angle lens, in accordance with one embodiment.

The present teachings will now be described in further detail by way of example and with reference to the figures. FIG. 1 shows an image frame 100 captured by a monitoring camera using a wide-angle lens. The image frame 100 is one of many frames that collectively form a video stream. The image frame 100 is composed of a number of pixels and includes an overlay area 102. The overlay area 102 illustrated in FIG. 1 contains textual information that specifies a date and a time for when the image was recorded. However, as was mentioned above, any data can be included as an overlay, such as data from an external sensor or device (e.g., temperature, wind speed, or humidity), or any type of custom text entered by a user, just to give some examples. The overlay does not have to be purely text, but could also include a graphical element, such as a logo or trademark, and the like.

Figure 3:
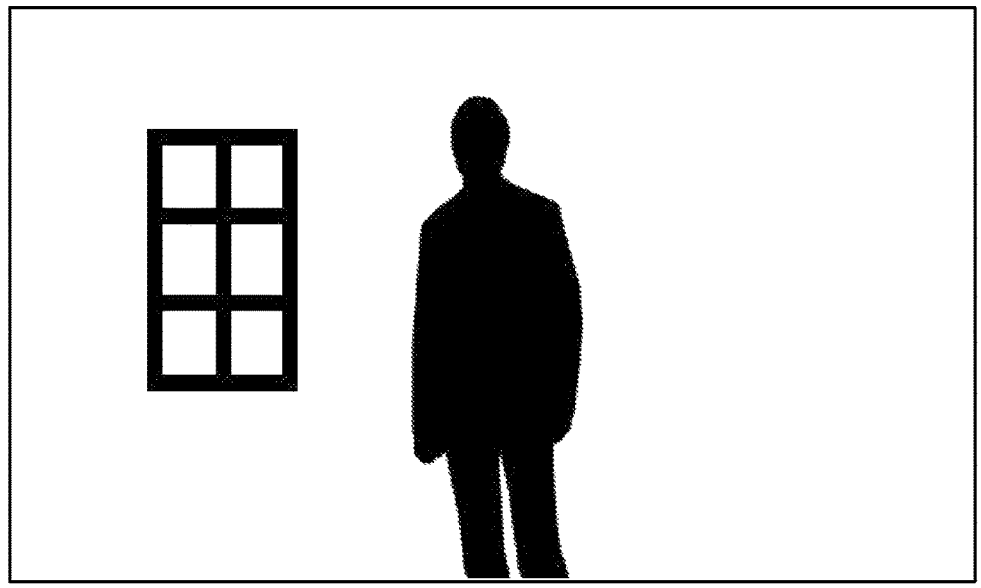
FIG. 3 shows a schematic image of the scene of FIG. 1 after dewarping using conventional techniques.
Figure 2:
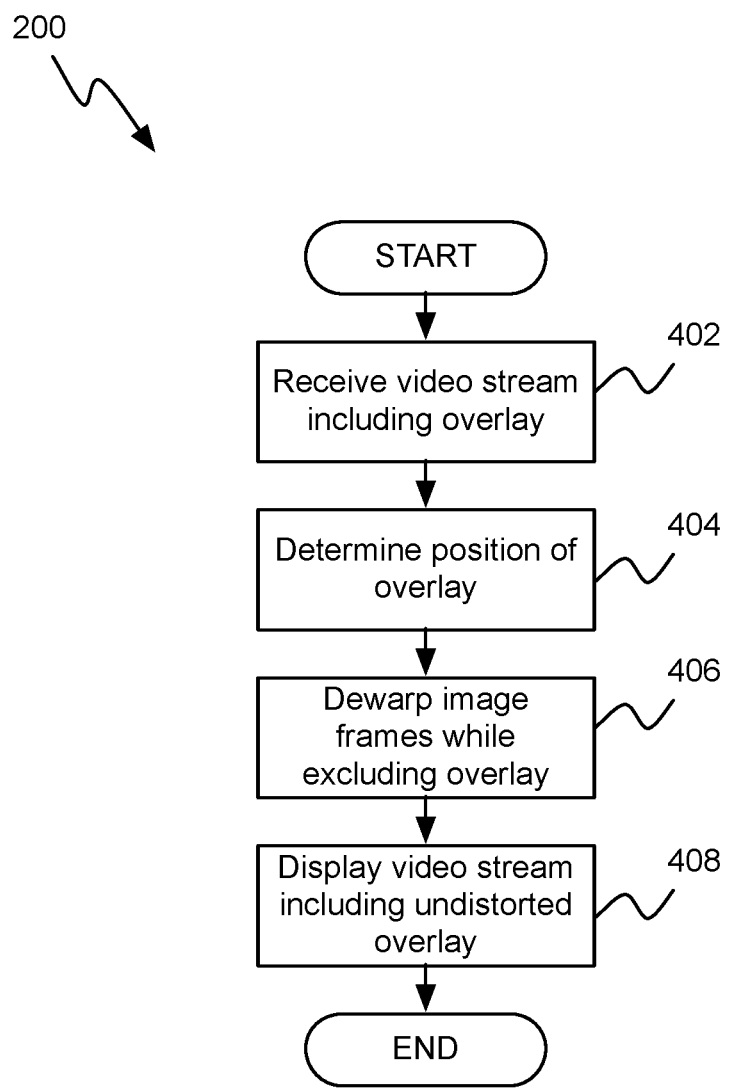
FIG. 2 is a flowchart of a process for correcting images in a video stream, in accordance with one embodiment.
Figure 4:
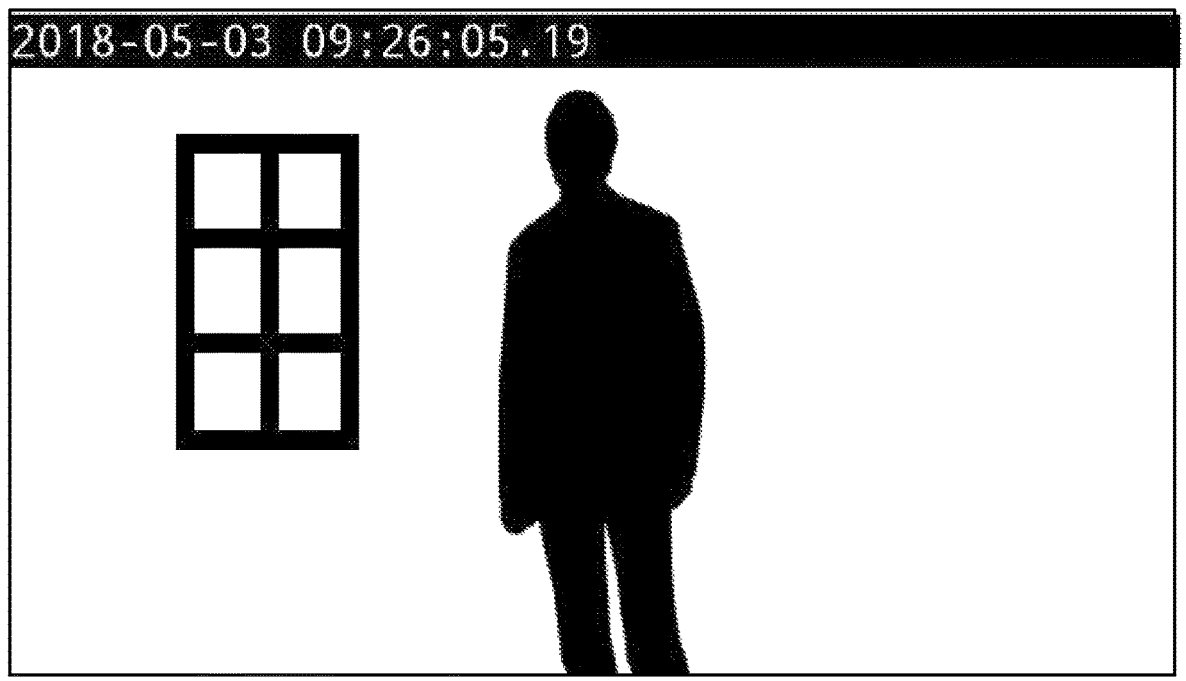
FIG. 4 shows a schematic image of the scene of FIG. 1 after dewarping, in accordance with one embodiment.

A fisheye or wide angle lens allows the monitoring camera to capture a large scene, but in doing so, it also introduces significant amounts of distortion into the captured image. In order to reduce the geometrical distortion, provide correct orientation, and provide more detail in the image, the VMS dewarps the images in the video stream. When using conventional techniques for doing the dewarping, this causes the overlay to become warped or even completely disappear, as shown schematically in FIG. 3. This problem can be avoided using the various embodiments of the present teachings, which will now be described with reference to FIGS. 2 and 4. FIG. 2 shows a process 200 for dewarping an image and FIG. 4 shows a schematic example of a dewarped image with the overlay inserted, in accordance with one embodiment.

As can be seen in FIG. 2, the process 200 begins by the VMS receiving a video stream including an overlay, step 202. Typically, the video stream with the overlay is received from a monitoring camera. However, there are also situations in which the video may have been stored in intermediate storage, for example, on a server, for later processing by the VMS. In such situations the video is received from the server rather than directly from the monitoring camera.

Next, the VMS determines the position of the overlay within the image frames of the video stream, step 204. Typically, the position of the overlay will be the same within the entire video stream, but there may also be situations in which the position of the overlay could change at various time intervals or depending on what occurs in the area monitored by the video camera. The way in which the position of the overlay within the image frame is determined can be done in a number of ways. For example, in some embodiments, the camera (or server) may send the position of the overlay to the VMS, separately from the video stream, either by pushing the overlay position to the VMS or in response to the VMS querying the monitoring camera for the overlay position. In other embodiments, the position of the overlay may be encoded into the video stream. In yet other embodiments, the VMS may analyze the received video stream to find areas of the image that contains letters and/or numbers.

Once the overlay information has been determined, the VMS dewarps the individual image frames in the received video stream, step 206, while excluding the area containing the overlay from the dewarping operation. This can be done in a number of ways. For example, in one embodiment, either the entire image frame, or the image frame with the overlay portion excluded, is copied. An image adjustment function is then applied to the copied image frame (or copied portion of the image frame) to achieve the dewarping. Finally, the copied original overlay is inserted in the dewarped image frame. In other embodiments, the image frame is not copied, but instead the area of the overlay is locked, such that any image adjustment function that is applied to the image frame will not affect the area of the overlay.

Once the individual image frames in the video stream have been dewarped, the video stream with the undistorted overlay is displayed as shown in FIG. 4, step 208, which ends the process 200.

It should be noted that while the above operations have been described in the context of dewarping image adjustment functions (e.g., barrel distortion, pincushion distortion, etc.), the same principles can be applied to other types of image correction, such as rotation (where the image is arranged correctly in relation to a particular reference system), cropping (to avoid having to show so called "letter boxes" and to improve use of screen area), stitching, blending, or to correct exposure in the image frames of the video stream, just to mention a few examples. It should further be noted that there are also embodiments in which a user may specify the position of the overlay in the final dewarped image frames, rather than simply using the same position that the overlay had in the original image frames received by the VMS.

The present teachings may be a system, a method, and/or a computer program product at any possible technical detail level of integration. The computer program product may include a computer readable storage medium (or media) having computer readable program instructions thereon for causing a processor to carry out aspects of the present teachings.

The computer readable storage medium can be a tangible device that can retain and store instructions for use by an instruction execution device. The computer readable storage medium can be a non-transitory computer readable storage medium. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present teachings may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present teachings.

Aspects of the present teachings are described herein with reference to flowchart illustrations and/or block diagrams of methods, apparatus (systems), and computer program products according to embodiments of the present teachings. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present teachings. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for displaying a video comprising:
receiving, by a video management system, a video stream including a plurality of image frames, wherein at least one or more image frames in the video stream include an overlay that is inserted into the one or more image frames;
determining, by the video management system, a position of the overlay within an image frame;
applying, by the video management system, an image adjustment function to the image frame to create an adjusted image frame, wherein the image adjustment function uses the determined position of the overlay to adjust the image by copying the overlay from the image frame, spatially rearranging pixels of the image frame, and inserting the copied overlay into the image frame with the spatially rearranged pixels, or by spatially rearranging pixels of the image frame that do not form part of the overlay, wherein the image adjustment function keeps the appearance of the overlay unchanged; and
displaying the video stream including the adjusted image frame.

2. The method of claim 1, wherein applying the image adjustment function includes changing values of pixels in the image frame.

3. The method of claim 1, wherein, at the inserting, the copied overlay is inserted at the same position of the image frame from which the overlay was copied.

4. The method of claim 1, wherein the image adjustment function is one of: a dewarping function, an exposure correction function, and a cropping function.

5. The method of claim 1, wherein the video stream and overlay are received in real time from a monitoring camera.

6. The method of claim 1, wherein the video stream and overlay are received from a video server.

7. The method of claim 1, further comprising:
receiving, by the video management system and separately from the video stream, position information for the overlay in the video stream.

8. The method of claim 7, wherein the position information includes normalized coordinates for the position of the overlay in the video stream.

9. The method of claim 1, further comprising:
receiving a user input specifying a position of the overlay in the video stream with the spatially rearranged pixels.

10. A system for displaying a video comprising:
a memory; and
a processor,
wherein the memory contains instructions that when executed by the processor causes the processor to perform operations comprising:
receiving, by a video management system, a video stream including a plurality of image frames, wherein at least one or more image frames in the video stream include an overlay that is inserted into the one or more image frames;
determining, by the video management system, a position of the overlay within an image frame;
applying, by the video management system, an image adjustment function to the image frame to create an adjusted image frame, wherein the image adjustment function uses the determined position of the overlay to adjust the image by copying the overlay from the image frame, spatially rearranging pixels of the image frame, and inserting the copied overlay into the image frame with the spatially rearranged pixels, or by spatially rearranging pixels of the image frame that do not form part of the overlay, wherein the image adjustment function keeps the appearance of the overlay unchanged; and
displaying the video stream including the adjusted image frame.

11. A non-transitory computer readable storage medium including instructions which, when executed by a device having a processing capability, cause the device to execute instructions for displaying a video, the instructions causing the device to perform operations comprising:
receiving, by a video management system, a video stream including a plurality of image frames, wherein at least one or more image frames in the video stream include an overlay that is inserted into the one or more image frames;
determining, by the video management system, a position of the overlay within an image frame;
applying, by the video management system, an image adjustment function to the image frame to create an adjusted image frame, wherein the image adjustment function uses the determined position of the overlay to adjust the image by copying the overlay from the image frame, spatially rearranging pixels of the image frame, and inserting the copied overlay into the image frame with the spatially rearranged pixels, or by spatially rearranging pixels of the image frame that do not form part of the overlay, wherein the image adjustment function keeps the appearance of the overlay unchanged; and displaying the video stream including the adjusted image frame.

\* \* \* \* \*